(12) United States Patent
Ligonniere et al.

(10) Patent No.: US 9,114,879 B2
(45) Date of Patent: Aug. 25, 2015

(54) SEAT TABLE HAVING A CONTROLLED, OPTIMISED PATH AND IT'S ASSOCIATED SEAT

(75) Inventors: Laurent Ligonniere, Paudy (FR); Charles Erhmann, Issoudun (FR)

(73) Assignee: Zodiac Seats France, Issoudun (FR)

( * ) Notice: Subject to any disclaimer, the term of this patent is extended or adjusted under 35 U.S.C. 154(b) by 224 days.

(21) Appl. No.: 13/696,804

(22) PCT Filed: May 12, 2011

(86) PCT No.: PCT/FR2011/051066
§ 371 (c)(1),
(2), (4) Date: Jan. 2, 2013

(87) PCT Pub. No.: WO2011/141680
PCT Pub. Date: Nov. 17, 2011

(65) Prior Publication Data
US 2013/0093221 A1    Apr. 18, 2013

(30) Foreign Application Priority Data

May 12, 2010    (FR) ..................................... 10 53725
Sep. 14, 2010   (EP) ..................................... 10305984

(51) Int. Cl.
*B64D 11/06* (2006.01)
(52) U.S. Cl.
CPC ............ *B64D 11/06* (2013.01); *B64D 11/0604* (2014.12); *B64D 11/0638* (2014.12)
(58) Field of Classification Search
USPC ......... 297/135, 136, 137, 138, 144, 145, 146, 297/154, 143, 149, 150; 108/42, 49, 68, 69, 108/72, 143
See application file for complete search history.

(56) References Cited

U.S. PATENT DOCUMENTS

| | | | | |
|---|---|---|---|---|
| 1,324,503 A | | 12/1919 | Hirsch | |
| 1,634,929 A | | 7/1927 | Adolf et al. | |
| 2,582,703 A | * | 1/1952 | Kirshbaum | 297/144 |
| 2,635,680 A | * | 4/1953 | Zentmire | 297/144 |
| 4,148,264 A | * | 4/1979 | Caravias | 108/145 |
| 5,035,464 A | * | 7/1991 | Spallholtz | 297/144 |
| 5,339,749 A | * | 8/1994 | Hirose | 108/143 |

(Continued)

FOREIGN PATENT DOCUMENTS

| | | | |
|---|---|---|---|
| DE | 20020072 U1 | 4/2002 | |
| GB | 2187086 A * | 9/1987 | ............... A47C 7/62 |
| WO | 2008141829 A1 | 11/2008 | |

OTHER PUBLICATIONS

International Search Report and Written Opinion dated Sep. 5, 2011 in Application No. PCT/FR2011/051066.

*Primary Examiner* — David R Dunn
*Assistant Examiner* — Timothy J Brindley
(74) *Attorney, Agent, or Firm* — Kilpatrick Townsend & Stockton LLP; Dean W. Russell; Tiffany L. Williams

(57) ABSTRACT

The invention essentially relates to an aeroplane seat base (110) characterized in that said base comprises: a plate (1) suitable for moving along a horizontal path between an extended position and a stored position, a supporting arm (4) of variable length having a first end (4.1) connected to the seat (8) by means of a first hinged joint having a vertical pin and a second end (4.2) connected to the plate (1) by means of a second hinged joint having a vertical pin, and a guide device (121) controlling the path of the plate (1) following a unique path.

9 Claims, 4 Drawing Sheets

(56) References Cited

U.S. PATENT DOCUMENTS

| | | | |
|---|---|---|---|
| 5,547,247 A * | 8/1996 | Dixon | 297/145 |
| 5,564,779 A * | 10/1996 | Tolbert et al. | 297/144 |
| 5,597,199 A * | 1/1997 | Hoffman et al. | 297/144 |
| 5,746,138 A * | 5/1998 | Hirose | 108/145 |
| 6,059,357 A | 5/2000 | Peart | |
| 6,592,179 B1 * | 7/2003 | Miyazaki | 297/146 |
| 7,100,515 B2 * | 9/2006 | Helm et al. | 108/20 |
| 7,568,760 B1 * | 8/2009 | Lodes | 297/217.7 |
| 7,607,726 B2 * | 10/2009 | Orlo et al. | 297/125 |
| 7,963,231 B2 * | 6/2011 | Osborne et al. | 108/40 |
| 8,267,472 B2 * | 9/2012 | Large et al. | 297/217.3 |
| 8,336,956 B2 * | 12/2012 | Westerink et al. | 297/145 |
| 8,596,206 B2 * | 12/2013 | Legeay | 108/50.11 |
| 2003/0193220 A1 * | 10/2003 | Jensen | 297/146 |
| 2004/0100137 A1 * | 5/2004 | Johnson | 297/423.26 |
| 2005/0012375 A1 | 1/2005 | Giasson | |
| 2005/0040681 A1 * | 2/2005 | Goldman | 297/145 |
| 2005/0258672 A1 * | 11/2005 | Schweizer | 297/145 |
| 2007/0132283 A1 * | 6/2007 | Mitjans | 297/145 |
| 2010/0052397 A1 * | 3/2010 | Mishly | 297/451.4 |
| 2010/0133407 A1 * | 6/2010 | Fujieda et al. | 248/429 |
| 2010/0171342 A1 * | 7/2010 | Chen | 297/45 |
| 2010/0319588 A1 * | 12/2010 | Hanna et al. | 108/20 |
| 2014/0339860 A1 * | 11/2014 | Liu et al. | 297/144 |

\* cited by examiner

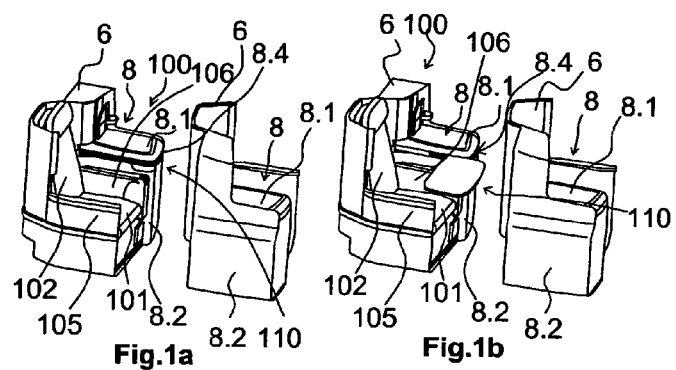
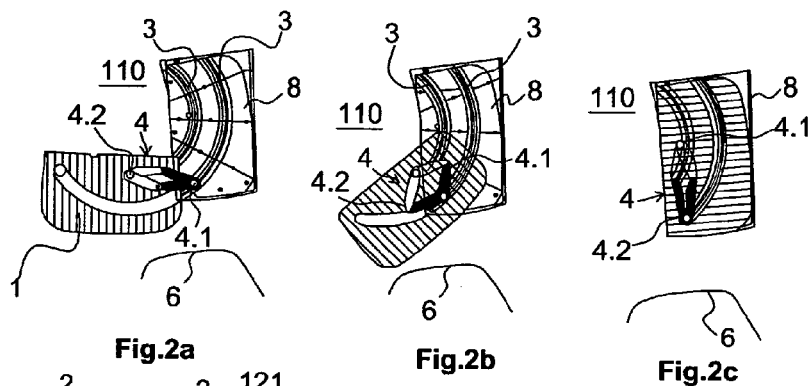
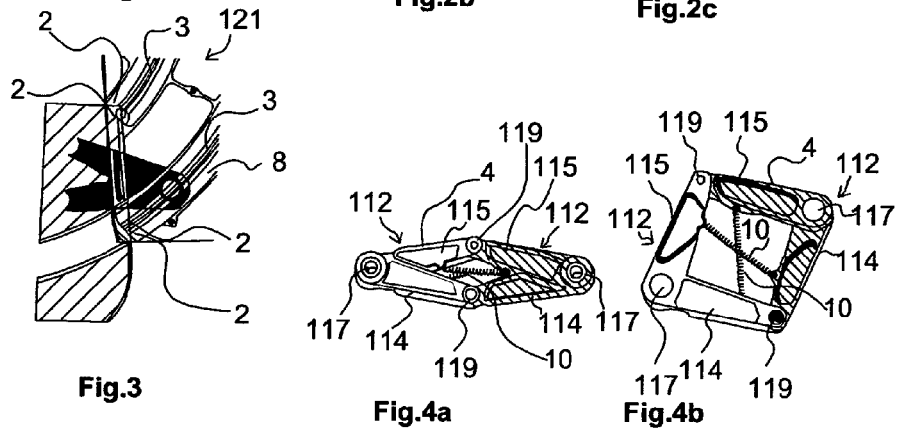

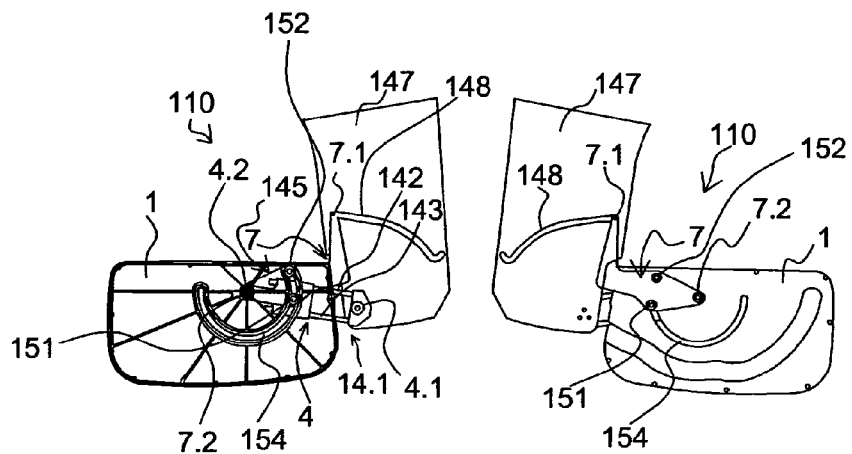
Fig.7a  Fig.7b
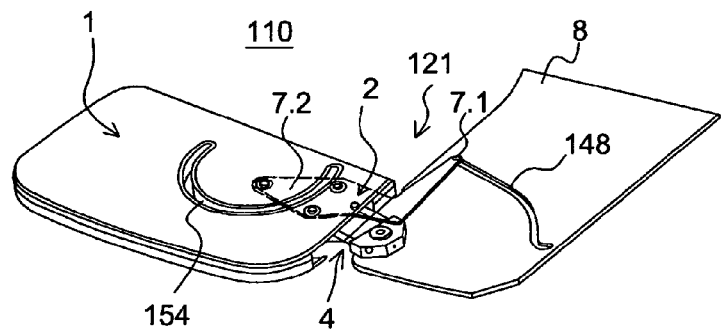
Fig.8

SEAT TABLE HAVING A CONTROLLED, OPTIMISED PATH AND IT'S ASSOCIATED SEAT

CROSS-REFERENCE TO RELATED APPLICATION

This application is the U.S. national phase of International Application No. PCT/FR2011/051066 filed on May 12, 2011, and published on Nov. 17, 2011 as International Publication No. WO2011/141680 A1, which application claims priority to French Patent Application No. 1053725 filed on May 12, 2010 and European Patent Application No. 10305984.6 filed on Sep. 14, 2010, the contents of all of which are incorporated herein by reference.

TECHNICAL FIELD OF THE INVENTION

The invention relates to a seat table having a controlled, optimised path and its associated seat.

A particularly favourable application for the invention lies in the field of tables for aeroplane seats.

STATE OF THE ART

Passenger seats on commercial aeroplanes are generally fitted with tables allowing passengers to eat meals, work, write or on which to put small objects.

These tables can only be used during the flight and must be folded during take-off, and landing, or during difficult flight conditions.

The methods used to extend aeroplane seat tables are very varied and depend on their storage position. Some are simple, as is the case for the majority of economy seats, others are more complex due to the reduced space available for storage and the limited access to this space, and may be difficult to use for uninitiated passengers.

The vast majority of tables are generally composed of a tray in one or two parts, and at least one supporting arm. Storage positions are extremely diverse: vertical, horizontal, surface-mounted or in recesses closed by doors or covers.

In addition to being difficult to use, these existing table systems may interfere with the passenger's body and/or the structure of the seat placed in front of the seat containing the table.

PURPOSE OF THE INVENTION

The purpose of the invention is to provide a solution to these problems.

For this reason, the invention concerns a seat table characterised in that it comprises:
- a tray capable of moving along a horizontal path between an extended position, wherein most of the tray is positioned external to a seat and a stored position, wherein most of the tray is positioned internal to the seat,
- a supporting arm of variable length having a first end connected to the seat by means of a first hinged joint having a vertical axe and a second end connected to the tray by means of a second hinged joint having a vertical axe, and
- a guide device controlling the path of the tray following a unique path when moving between the extended position and the stored position and vice-versa.

According to a first method of production, the supporting arm comprises two elements each formed by two rods connected to each other at one of their ends by a hinged joint having a vertical axe, and these two elements being connected to each other at their ends by means of hinged joints having a vertical axe, two hinged joints of the arm being merged with the hinged joints between the ends of the arm and the seat and tray respectively.

The guide device comprises two rollers attached to the tray and two concentric rails connected to the seat.

The arm is preferably fitted with two return springs, the purpose of which is to help move the tray.

According to a second method of production, the supporting arm comprises:
- a first part connected in rotation to a plate belonging to the seat by means of the first hinged joint, this first part comprising at least one longitudinal bar and
- a second part connected in rotation to the tray by means of the second hinged joint, this second part being equipped with an opening designed to receive the bars in such a way that the second part can move in translation along the bar.

The guide device is thus formed by a connecting part having a first end connected to the plate by means of a first hinged joint having a vertical axe, this end being capable of moving along a groove made within the plate and a second end connected to the plate by means of a second hinged joint having a vertical axe, and at least one roller attached to the tray and one rail connected to the seat.

Preferably, the connecting part also comprises a retaining device to prevent the tray from pivoting in a vertical plane.

According to one construction, the retaining device comprises at least one retaining peg having a collar extending in the plane of the tray, this retaining peg resting against an edge of a groove in the shape of semi-circle made in the tray.

According to one construction, the tray being hollow, the arm is housed within the hollow in the tray.

According to one construction, the table also comprises a locking device blocking any movement of the supporting arm in relation to the tray when the tray is in its stored position.

The invention also concerns an aeroplane seat characterised in that it comprises a table according to the invention.

BRIEF DESCRIPTION OF THE FIGURES

The invention will be better understood after reading the following description and examining the accompanying figures. These figures are given for illustration only and in no way limit the invention. They show:

FIGS. 1a and 1b: perspective views of an aeroplane seat comprising a seat fitted with a table according to the invention respectively in a stored position and in an extended position;

FIGS. 2a-2c: top views of a table according to a first method of production of the invention in the different stages used to switch from an extended position to a stored position;

FIG. 3: a detailed view of the connection between the table in FIGS. 2a-2c and the seat;

FIGS. 4a and 4b: views of the table's supporting arm in FIGS. 2a-2c in two different positions;

FIGS. 7a and 7b: views respectively from beneath and above a table constructed according to a second method of producing the invention in an extended position;

FIG. 8: a perspective view of the table in FIGS. 7a-7b in an extended position;

Figure 5:
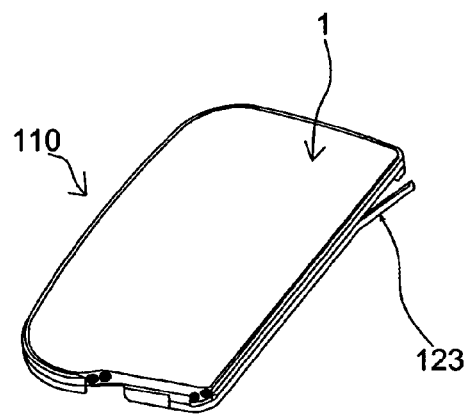
FIG. 5: a perspective view of the table in FIGS. 2a-2c fitted with a hinged lever belonging to a locking device.

Identical, similar and analogue elements are given the same references from one figure to another.

DESCRIPTION OF EXAMPLES OF WAYS OF CONSTRUCTING THE INVENTION

FIGS. 1 to 6 show a first method of producing the table according to the invention.

More precisely, FIGS. 1a and 1b show a seat (100) comprising a seat base (101) and a backrest (102) which is hinged in relation to the seat base (101). The backrest (102) can move from a reclined position in which the passenger is in a laying position to a raised position in which the passenger is in a sitting position. The so-called TTL (Taxi, Take off and Landing) raised position is the position adopted by the passenger when the aeroplane is in take-off, landing or parking phase. Two armrests (105) and (106) are located on either side of the seat base (101).

Moreover, a structure (8) is fitted to one side of the seat (100). This structure (8) comprises in its upper part (8.1) a flat surface on which the passenger can place objects and in its lower part (8.2) a cavity (not visible in the figures) comprising a foot-rest for the feet of the passenger located behind the seat (100). In addition, the seat (8) comprises an opening (8.4) extending horizontally to house the tray (1) when the tray (1) is in stored position. This opening (8.4) is located under the upper part (8.1) of the side structure of the seat (8) above the passenger footrest.

The seat (100) also comprises a surround enclosing the rear part of the backrest (102) and the seat structure (8) thus isolating the passenger from the external environment to give more privacy. The terms "front" and "rear" are given in relation to a passenger sitting on the seat (100), the "front" elements being positioned in front of the passenger, whereas the "rear" elements are located behind the passenger.

A seat table referenced (110) comprises a tray (1), capable of moving from an extended position (see FIG. 2a) wherein most of the tray (1) is positioned external to the seat (8) and a stored position (see FIG. 2c) wherein most of the tray is positioned internal to the seat (8). To move from one position to another, the tray (1) moves along a flat horizontal path. The terms "horizontal" and "vertical" are given in relation to an aeroplane located on the ground, a "horizontal" direction being parallel to the floor of the aeroplane, and a "vertical" direction being perpendicular to the floor of the aeroplane. The horizontal plane along which the table moves also includes a plane forming an angle of a few degrees with the floor to compensate for the plane's attitude during flight.

A supporting arm (4) of variable length having a first end (4.1) connected to the seat (8) by means of a first hinged joint having a vertical axe and a second end (4.2) connected to the tray (1) by means of a second hinged joint having a vertical axe. It is reminded that a hinged joint between two elements allows these two elements to move in rotation in relation to each other according to a rotational axis.

As illustrated in FIGS. 4a and 4b, the supporting arm (4) is in the form of a pantograph. For this purpose, the arm (4) comprises two elements (112) each formed by two rods (114) and (115) hinged together at one of their ends by a hinged joint (117) having a vertical axe. The elements (112) are thus in the form of a V. Moreover, these two elements (112) are connected together at their ends by means of hinged joints (119) having vertical axes. The arm (4) is thus in the form of a hinged diamond where its sides meet. This configuration used for the arm (4) allows the distance to be varied between the ends of the arm (4) corresponding to the connections (117). It is also stressed that the connections (117) of the arm (4) are merged with the hinged joints between the ends (4.1), (4.2) of the arm (4) and respectively the seat (8) and the tray (1).

Preferably, the arm (4) is fitted with two return springs (10) to help extend or fold the seat table (110) inside the seat (8). For this purpose, each spring (10) is attached by the ends to two opposite sides of the rods (114), (115) forming the sides of the diamond.

Moreover, a guide device (121) is used to control the path of the tray (1) when it is moving between the extended position and the stored position. "Control the path" signifies that the guide device (112) ensures that the table (1) moves from an extended position to a stored position and vice-versa following a unique path. For this purpose, the guide device (121) controls in particular, the length of the arm (4) according to the position of the tray (1).

This guide device (121) is formed by at least one roller (2) connected to the tray (1) and at least one curved rail (3) attached to the seat (8), the roller (2) moving along the rail (3). In this case, this device (121) comprises four rollers (2) and two concentric rails (3) arranged so that two rollers (2) interacting with each of the rails (3).

The combined movements of the arm (4) and the guide device (121) avoid any interference of the seat table (110) with the surround (6) of the seat in front (6), whilst at the same time maximising the living space available to the passenger when extending the table.

The tray (1) is preferably hollow, allowing all the mechanisms, in particular the arm (4), to be located inside the hollow interior of the tray (1), avoiding any risk of passengers trapping their fingers.

Figures 6A, 6B:
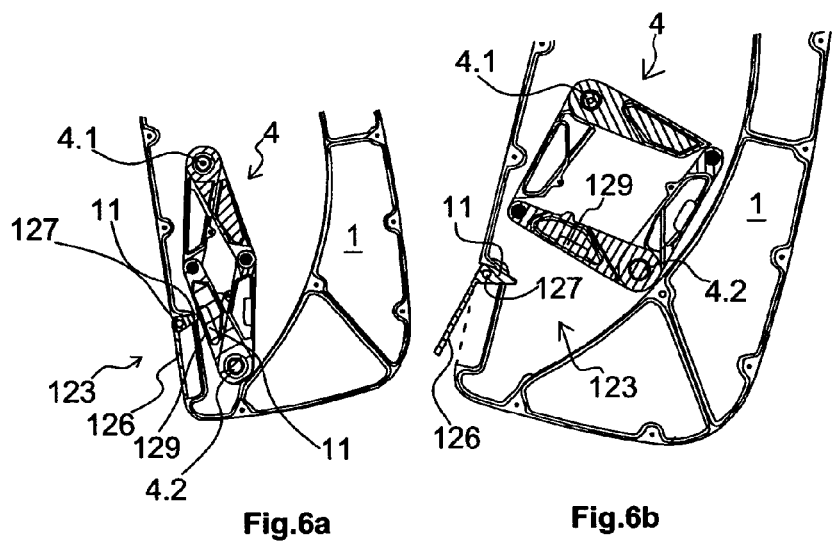
FIGS. 6a and 6b: top views of the table in FIGS. 2a-2c respectively when the locking device is in a locked position and in an unlocked position.

The seat table (110) is preferably locked in stored position by means of a locking device (123) illustrated in FIGS. 5 and 6. This device (123) prevents any relative movement between the tray (1) and the arm (4) (but not between the table (1) and the seat (8)). More precisely, this locking device (123) comprises a lever (126) connected to the tray (1) by means of a hinged joint (127) having a vertical axe. This lever (126) is positioned along the longitudinal side of the tray (1) in a recess in the tray (1). This lever (126) comprises a latch (11) at one end. Moreover, a cavity (129) is provided in one of the rods (114), (115) of the arm (4).

In locked position, the latch (11) is positioned inside the cavity (129) so as to lock movement of the seat table (110). However, when it is in unlocked position, the latch (11) is released from the cavity (129) enabling the seat table (110) to be moved freely from one position to the other by the passenger. Extending and storing the seat table (110) can be performed easily by the passenger by means of the lever (126) using a natural pulling or pushing movement. The hinged joint (127) shall preferably comprise a return spring drawing the lever (126) against the edge of the tray (1) when the lever (126) is not operated by the passenger.

The locking device (123) is fitted inside the tray (1) of the seat table (110), thus avoiding having to fit additional equipment to the seat (8).

Figure 9:
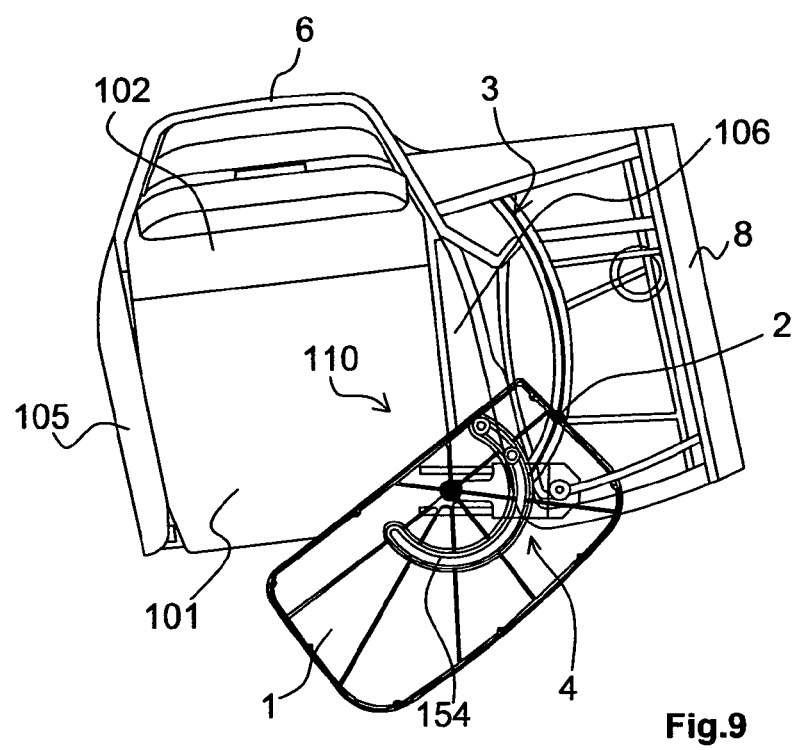
FIG. 9: a top view of an aeroplane seat comprising a seat fitted with a table in FIGS. 7a-7b in which the components of the guide device are visible by transparency.

FIGS. 7 to 9 show a second method of producing the seat table (110) according to the invention.

Using this method of production, the supporting arm (4) of variable length has a first end (4.1) connected to a plate (147) belonging to the seat (8) by means of a first hinged joint having a vertical axe, and a second end (4.2) connected to the tray (1) by means of a second hinged joint having a vertical axe (see FIGS. 7a-7b).

More precisely, the supporting arm (4) comprises a first part (141) connected in rotation to the plate (147) by means of the first hinged joint. This first part (141) comprises two longitudinal parallel bars (142) and (143). The supporting arm (4) also comprises a second part (145) connected in rotation to the tray (1) by means of the second hinged joint. This second part (145) is equipped with two openings intended to receive the bars (142) and (143). This allows the distance to be varied between the first part (141) and the second part (145) and thus the length of the arm (4). As a variation, the arm (4) comprises one or several bars (142), (143).

The guide device (121) comprises a hinged connecting part (7) fitted between the seat (8) and the tray (1). The connecting part (7) comprises a first end (7.1) connected to a plate (147) by means of a first hinged joint having a vertical axe. This end (7.1) is also able to move inside a transversal groove (148) which extends between the longitudinal sides of the plate (147). The connecting part (7) comprises a second end (7.2) connected to the tray (1) by means of a second hinged joint having a vertical axe.

Preferably, the connecting part (7) also comprises a retaining device to prevent the tray (1) from pivoting in a vertical plane. In this case, the retaining device comprises at two retaining pegs (151) and (152), each having a collar extending along the plane of the tray (1), these retaining pegs (151) and (152) resting against an edge of a groove (154) in the shape of semi-circle made in the tray (1). The pegs (151) and (152) can move along the groove (154), the pegs (151) and (152) penetrate inside the tray (1) via the underside of the tray (1), the collars being located in the upper part of the pegs (151) and (152). The collars and the edges of the groove (154) extend in the plane of the tray (1), a lower surface of the collar being placed against the upper surface of the edge of the groove.

As illustrated in FIGS. 8 and 9, the guide device (121) also comprises a roller (2) connected to the tray (1) and at least one curved rail (3) attached to the seat (8), the roller (2) moving along the rail (3). The hollow in the curve of the rail (3) is located on the passenger side.

The tray (1) is preferably hollow to house the arm (4) and the connecting part (7) inside the tray (1) when the tray (1) is in stored position.

A locking device (123) can of course be adapted to the second method of production shown in FIGS. 7 to 9 to lock the tray (1) in stored position.

The invention claimed is:

1. A table for a seat comprising:
a tray capable of moving along a horizontal path between an extended position, wherein most of the tray is positioned external to a seat and a stored position, wherein most of the tray is positioned internal to the seat,
a supporting arm of variable length having a first end connected to the seat by means of a first hinged joint having a vertical axis of rotation and a second end connected to the tray by means of a second hinged joint having a vertical axis of rotation,
wherein the supporting arm comprises two elements, each element formed by two rods connected to each other at one of their ends by a hinged joint having a vertical axis of rotation, these two elements being connected to each other at their ends by means of hinged joints having a vertical axis of rotation, two hinged joints of the arm being merged with the hinged joints between the ends of the arm and the seat and tray respectively, and
a guide device controlling the path of the tray following a unique path when moving between the extended position and the stored position and vice-versa.

2. A table according to claim 1, wherein the guide device comprises two rollers attached to the tray and two concentric rails connected to the seat.

3. A table according to claim 1, wherein the arm is equipped with two return springs, the purpose of which is to help move the tray.

4. A table according to claim 1, wherein the tray is hollow and the arm is housed within the hollow of the tray.

5. A table according to claim 1, further comprising a locking device blocking any movement of the supporting arm in relation to the tray when the tray is in its stored position.

6. An aircraft seat comprising the table according to claim 1.

7. A table for a seat comprising:
a tray capable of moving along a horizontal path between an extended position, wherein most of the tray is positioned external to a seat and a stored position, wherein most of the tray is positioned internal to the seat,
a supporting arm of variable length having a first end connected to the seat by means of a first hinged joint having a vertical axis of rotation and a second end connected to the tray by means of a second hinged joint having a vertical axis of rotation, and
a guide device controlling the path of the tray following a unique path when moving between the extended position and the stored position and vice-versa,
wherein the tray is hollow and that the arm is housed within the hollow of the tray.

8. A table according to claim 7, further comprising a locking device blocking any movement of the supporting arm in relation to the tray when the tray is in its stored position.

9. An aircraft seat comprising the table according to claim 7.

* * * * *